US009038910B2

(12) United States Patent
Yang et al.

(10) Patent No.: US 9,038,910 B2
(45) Date of Patent: May 26, 2015

(54) METHOD AND APPARATUS FOR EXECUTING USER ACTION COMMANDS

(71) Applicant: TENCENT TECHNOLOGY (SHENZHEN) COMPANY LIMITED, Shenzhen (CN)

(72) Inventors: Huijiao Yang, Shenzhen (CN); Bo Hu, Shenzhen (CN); Ruiyi Zhou, Shenzhen (CN); Kai Zhang, Shenzhen (CN); Zhengkai Xie, Shenzhen (CN); Ying Huang, Shenzhen (CN); Yulei Liu, Shenzhen (CN); Wei Li, Shenzhen (CN); Cheng Feng, Shenzhen (CN); Tingyong Tang, Shenzhen (CN); Xi Wang, Shenzhen (CN); Sha Mo, Shenzhen (CN); Bosen He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/153,053

(22) Filed: Jan. 12, 2014

(65) Prior Publication Data
US 2014/0124580 A1 May 8, 2014

Related U.S. Application Data

(63) Continuation of application No. PCT/CN2013/083299, filed on Sep. 11, 2013.

(30) Foreign Application Priority Data

Sep. 20, 2012 (CN) .......................... 2012 1 0351824

(51) Int. Cl.
G06K 7/10 (2006.01)
G06K 9/36 (2006.01)
(Continued)

(52) U.S. Cl.
CPC ........... G06K 7/1417 (2013.01); *H04M 1/2755* (2013.01); *H04M 1/72519* (2013.01); *H04M 2250/52* (2013.01)

(58) Field of Classification Search
CPC ............. G06K 7/10; G06K 9/22; G06K 9/36; G06K 9/80; G06K 9/18; G06K 19/06; G06K 7/14; G08C 21/00; G02B 26/10; G06F 17/00
USPC .................... 235/462.1, 462.09, 462.07, 375, 235/462.25, 454
See application file for complete search history.

(56) References Cited

U.S. PATENT DOCUMENTS 8,807,434 B1 * 8/2014 Windmueller et al. .. 235/462.09
2005/0011957 A1 * 1/2005 Attia et al. ............... 235/462.46
(Continued)

FOREIGN PATENT DOCUMENTS

CN 101043643 A 9/2007
CN 101702192 A 5/2010
(Continued)

OTHER PUBLICATIONS

The World Intellectual Property Organization (WIPO) International Search Report for PCT/CN2013/083299 Dec. 26, 2013.

*Primary Examiner* — Edwyn Labaze
(74) *Attorney, Agent, or Firm* — Anova Law Group, PLLC

(57) ABSTRACT

A method is provided for performing action commands on a mobile terminal. The method includes reading a 2D barcode to obtain 2D barcode information. The 2D barcode information includes at least an action command identifier and a call instruction for calling an application program interface (API) corresponding to the action command. The method also includes calling the API corresponding to the action command and completing execution of the action command.

12 Claims, 3 Drawing Sheets

(51) Int. Cl.
  *G06K 9/80* (2006.01)
  *G06K 7/14* (2006.01)
  *H04M 1/725* (2006.01)
  *H04M 1/2755* (2006.01)

(56) References Cited

U.S. PATENT DOCUMENTS

2005/0139674 A1* 6/2005 Ishibashi et al. .............. 235/454
2011/0014905 A1* 1/2011 Eschenauer et al. .......... 455/418
2011/0068175 A1* 3/2011 Powers et al. ............ 235/462.25
2013/0018701 A1* 1/2013 Dusig et al. ................... 705/7.32
2013/0173435 A1* 7/2013 Cozad, Jr. ....................... 705/28

FOREIGN PATENT DOCUMENTS

| | | |
|---|---|---|
| CN | 102034075 A | 4/2011 |
| CN | 102929595 A | 2/2013 |
| EP | 0984349 B1 | 11/2008 |

* cited by examiner

METHOD AND APPARATUS FOR EXECUTING USER ACTION COMMANDS

CROSS-REFERENCES TO RELATED APPLICATIONS

This application is a continuation application of PCT Patent Application No. PCT/CN2013/083299, filed on Sep. 11, 2013, which claims priority of Chinese Patent Application No. 201210351824.4, filed on Sep. 20, 2012, the entire contents of all of which are incorporated by reference herein.

FIELD OF THE INVENTION

The present invention generally relates to computer technologies and, more particularly, to a method and system for executing user action commands.

BACKGROUND

Two-dimensional (2D) barcode is a new information bearer developed on the basis of the one-dimensional barcode, but can record more data and is more complex than the one-dimensional barcode, such as for recording images, web links, etc. The 2D barcode has been widely used in commercial activities, especially in high-tech, storage and transportation, and 1D document management, etc. With the development of mobile phones, especially smart phones, the 2D barcode are being used by more and more people. However, currently, most of the 2D barcode applications only concern direct presentation of the information carried by the 2D barcode after scanning the 2D barcode.

Under current technologies, applications running on mobile phones are implemented by calling the Application Programming Interface (API) openly provided by the operating system on the mobile phones. While the mobile applications call the system APIs on the mobile phone, a mobile application itself provides its own APIs, calling which can utilize the corresponding functions provided by the mobile application. Alternatively, Near Field Communication (NFC) technology may be used to call APIs, allowing a device (typically a mobile phone) within a limited range to collect data from another device or an NFC tag.

However, under the current technologies, when calling the open APIs of the mobile phone operating system, the application corresponding to the API often requires the user to download and install the application, and to run the application calling the API. Thus, it may require interactions with backend servers to complete the user authentication and authorization, and the process to achieve the corresponding function on mobile phones is more complex. Further, when calling API through NFC, because the NFC communication standards are not unified, such technology has not yet been widely accepted, resulting less NFC equipment on the market and higher operating cost. Further, NFC uses radio frequency identification (RFID), which may be read by an unauthorized party, and the secret key may be easily broken, causing security concerns.

The disclosed method and system are directed to solve one or more problems set forth above and other problems.

BRIEF SUMMARY OF THE DISCLOSURE

One aspect of the present disclosure includes a method for performing action commands on a mobile terminal. The method includes reading a 2D barcode to obtain 2D barcode information. The 2D barcode information includes at least an action command identifier and a call instruction for calling an application program interface (API) corresponding to the action command. The method also includes calling the API corresponding to the action command and completing execution of the action command.

Another aspect of the present disclosure includes an action command execution system. The system includes a reading unit configured to read a 2D barcode to obtain 2D barcode information. The 2D barcode information includes at least an action command identifier and a call instruction for calling an application program interface (API) corresponding to the action command. The system also includes a call unit configured to call the API corresponding to the action command and an execution unit configured to complete execution of the action command.

Another aspect of the present disclosure includes a non-transitory computer-readable medium having computer program. When being executed by a processor, the computer program performs a method for performing action commands on a mobile terminal. The method includes reading a 2D barcode to obtain 2D barcode information. The 2D barcode information includes at least an action command identifier and a call instruction for calling an application program interface (API) corresponding to the action command. The method also includes calling the API corresponding to the action command and completing execution of the action command.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

A two-dimensional (2D) barcode may be used to carry not only data but also commands to perform certain actions on a mobile terminal. Especially, the mobile terminal may be equipped with a 2D barcode scanner/reader, or a camera with image recognition software to scan and/or read the 2D barcode to execute certain actions automatically.

Figure 5:
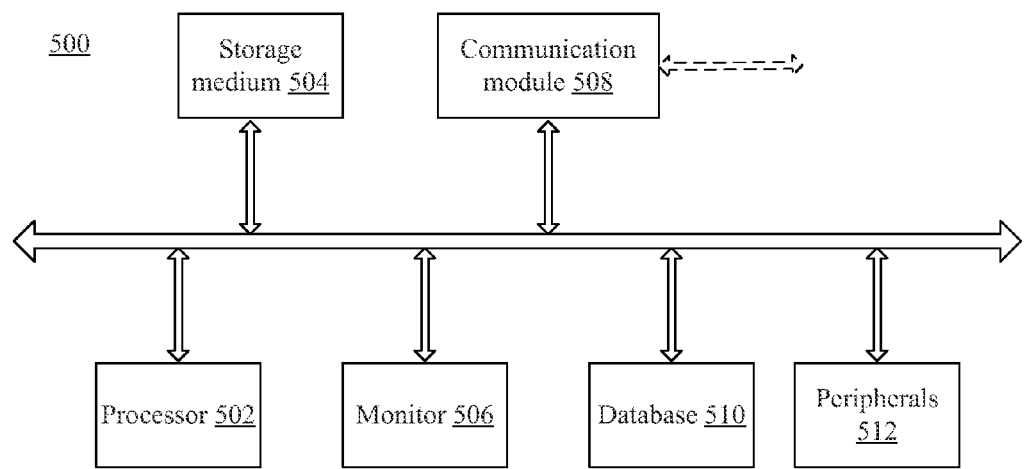
FIG. 5 illustrates a block diagram of an exemplary mobile terminal consistent with the disclosed embodiments.

FIG. 5 illustrates an exemplary mobile terminal 500 for implementing the disclosed methods and apparatus. A mobile terminal may include any appropriate type of mobile computing devices, such as mobile phones, smart phones, tablets, notebook computers, or any type of mobile computing platform. A mobile terminal may be controlled by an operating system and may support various application software, i.e., one or more clients, to provide certain functionalities. For example, the client may include a browser, a calendar application, a user application, etc. Any type of client software may run on the mobile terminal 500 as supported by the operating system, which may include a set of APIs for the mobile applications.

As shown in FIG. 5, mobile terminal 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as Read-only memory (ROM), Random Access Memory (RAM), flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices, such as keyboard, mouse, camera, video camera, and/or barcode scanner/reader, etc. Monitor 506 may include any appropriate screen for displaying various information to a user. The communication module 508 may include network devices for establishing connections through the communication network. Database 510 may include one or more databases for storing certain data and for performing certain operations on the stored data, such as database searching.

Figure 1:
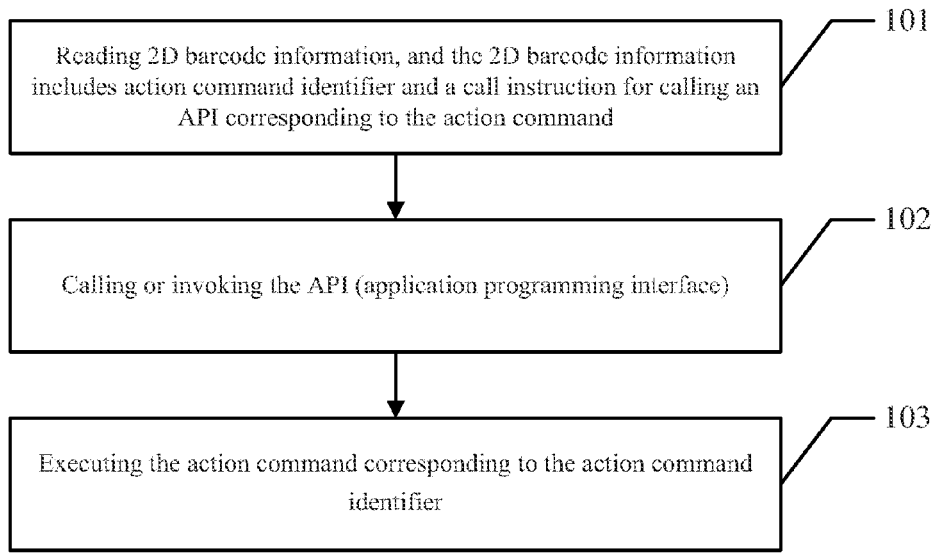
FIG. 1 illustrates a flow diagram of an exemplary action command operation process consistent with the disclosed embodiments.

In operation, the mobile terminal 500 may provide certain action command execution functionalities to a user of the mobile terminal 500 to carry out actions requested by the user or actions provided for the user. FIG. 1 illustrates a flow diagram of an exemplary action command operation process consistent with the disclosed embodiments.

As shown in FIG. 1, the action command operation process may include the following steps.

Step 101, reading 2D barcode information from a 2D barcode. The 2D barcode information includes an action command identifier and a call instruction for calling an API corresponding to the action command. The 2D barcode information may also include multiple action command identifiers each corresponding to an API containing in the call instruction.

The mobile terminal may start a module for scanning 2D barcode, and may read the scanned 2D barcode using 2D barcode scanning software in the module to read the 2D barcode information. The 2D barcode information may include: action command identifier and the call instruction for calling an API corresponding to the action command. The action command identifier may be used to indicate that the 2D barcode is a 2D action command barcode, and the content of the action command. The call instruction is used to call the API corresponding to the action command.

The mobile terminal may scan the 2D barcode using a 2D barcode reader or scanner. Or the mobile terminal may take a photo of the 2D barcode and perform image recognition to detect and read the barcode. Alternatively, the mobile terminal may receive the 2D barcode by other means, such as by an email, a text, an IM (instant message), etc.

Step 102, calling or invoking the API (application programming interface). That is, based on the call instruction in the 2D barcode indicating the API corresponding to the action command, calling the API to access a software routine(s) corresponding to the API.

A routine is similar to a function, but with more complete meaning A routine is computer program code. On a mobile terminal, in general, a routine is used to carry out certain actions, and such routine may be an application routine to be used directly or may be providing services for other routines. That is, the routine may be provided by a user application or by system software on the mobile terminal.

Step 103, executing the action command corresponding to the action command identifier. That is, completing the execution of the action command. The action command identifier determines what type of action command(s) is in the 2D barcode, and the action command information may be realized by action command identifier statement(s). When the action command identifier statement is read, the action command indicated by the action command identifier is carried out.

Thus, the mobile terminal reads the 2D barcode information and, according to the call instruction indicating an API corresponding to an action command in the 2D barcode, calls the API to carry out the action command based on the action command identifier in the 2D barcode. That is, by only scanning the 2D barcode once, the API corresponding to the action command can be called to carry out the action command. The corresponding functions of the mobile terminal can thus be realized without having to interact with the backend server for mutual authentication. The action command can be executed only on the mobile terminal unilaterally, without the need to download and install related program. The user operating time can be reduced, and the cost for using the mobile terminal functionalities can also be reduced.

Figure 2:
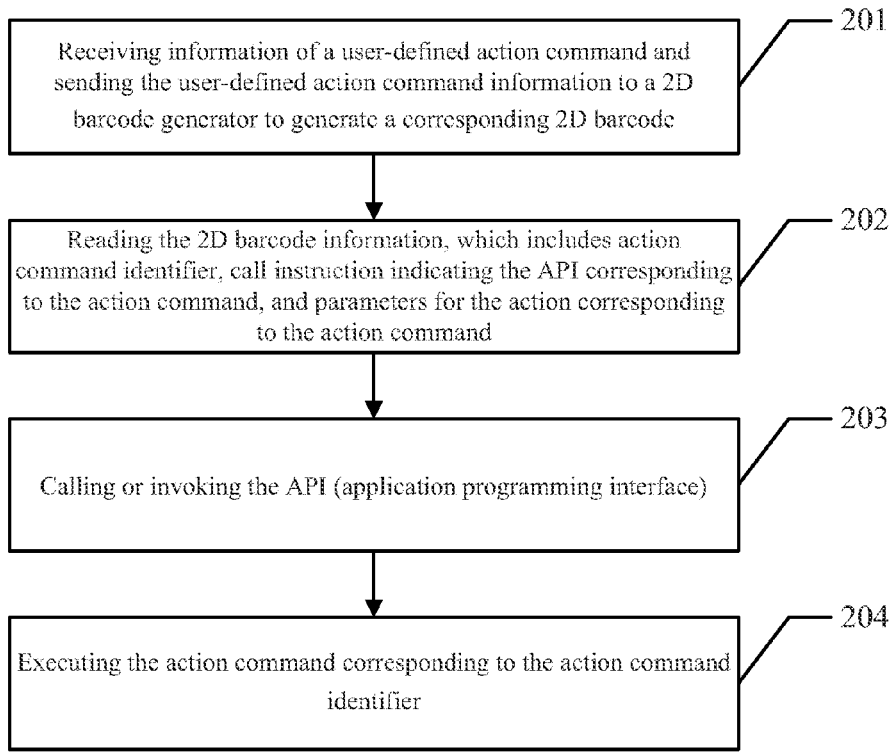
FIG. 2 illustrates a flow diagram of another exemplary action command operation process consistent with the disclosed embodiments.

FIG. 2 illustrates another exemplary user action command operation process consistent with the disclosed embodiments. As shown in FIG. 2, the user action command operation process may include the following steps.

Step 201, receiving information of a user-defined action command and sending the user-defined action command information to a 2D barcode generator to generate a corresponding 2D barcode.

That is, the mobile terminal may generate a 2D barcode required by the user according to the user's instruction. The mobile terminal may provide a user interface to receive from the user a user-defined action command, and sends the user-defined action command information to the 2D barcode generator to generate the corresponding 2D barcode. In other words, after receiving the user instruction, the mobile terminal may generate a user-defined action command, and sends the user-defined action command to the 2D barcode generator together with other information associated with the user-defined action command.

For example, when the user requires certain actions that can be periodically repeated on the mobile terminal, the user can define a 2D barcode for such actions. Because the 2D barcode can carry certain complex information, and can interact with mobile terminals naturally, it may be an excellent way for the user to use 2D barcode to carry out a series of actions. Especially for those repetitive and/or tedious operations, the user may write action commands into the corresponding 2D barcode, so that the user can have personalized and practical 2D barcode.

Step 202, reading the 2D barcode information. The 2D barcode information includes action command identifier, call instruction indicating the API corresponding to the action command, and parameters for the action corresponding to the action command, etc.

Further, the action command identifier may be a single action command (i.e., indicating a single action) or may be a combined action command for performing a series of actions. The combined action command is used to execute multiple action commands as if executing a single action command, i.e., a batch execution. Because some action commands can be effectively executed in batch, with a high repetitive rate, such action commands can executed automatically in sequence to implement effective actions. Thus, these action commands can be grouped into a combined action command, such that the combined action command can be executed without individually executing the series of action commands separately. Alternatively, one action command may include multiple call instructions each calling an API for performing a different function. Thus, mobile terminal repetitive operations can be avoided, reducing the time to perform an action. The 2D barcode may include both a single action command and a combined action command.

In addition, the mobile terminal can read any appropriate types of 2D barcodes. That is, besides reading the user-defined 2D barcode information to perform user action commands, the mobile terminal may also read 2D barcodes generated by manufacturers, operators, and/or other third parties, such that the mobile terminal can perform the action commands preconfigured by the manufacturers, operators, and/or other third parties, such as mobile application developers.

To read the 2D barcode, the mobile terminal may start the module for scanning 2D barcode, and may read the scanned 2D barcode using 2D scanning software in the module to read the 2D barcode information. The 2D barcode information includes: an action command identifier, the call instruction for calling an API corresponding to the action command, and action parameter information corresponding to the action command identifier. The action command identifier may be used to indicate that the 2D barcode is a 2D action command barcode, and also indicate the content of the action command. The call instruction is used to call the API corresponding to the action command, and the action parameter information corresponding to the action command identifier includes parameters required for performing the action command, such as user name, password, authentication information, and user information recorded in the past or system information, etc.

Step 203, calling the API by using the call instruction. That is, based on the call instruction corresponding to the action command in the 2D barcode, call the API corresponding to the call instruction.

Step 204, carrying out the action command corresponding to the action command identifier. The action command identifier determines what type of action command(s) is in the 2D barcode, and the action command information may be realized by action command identifier statement(s). When an action command identifier statement is read, the action command indicated by the action command identifier is carried out, and the next action command identifier statement is read, until all action command identifier statements are carried out.

The followings are a use scenario for illustrative purposes. A business creates a 2D barcode, and the 2D barcode contains a single action command identifier. For example, the business adds a 2D barcode on a receipt for its customer, and the 2D barcodes provide WIFI wireless network service to its customer.

The customer uses his/her mobile phone to scan the 2D barcode on the receipt to access the WIFI service. More specifically, the mobile phone scans the 2D barcode on the receipt and read the 2D barcode information. The 2D barcode information includes: an action command identifier, a call instruction corresponding to the API to connect the WIFI network, and parameter information for connecting the WIFI function, such as the ID or name of the hotspot of the business's WIFI network and password. Using the 2D barcode, the mobile phone automatically connects to the business's WIFI network. That is, the mobile phone only needs to scan a 2D barcode, without interaction to any server or downloading any application program, to achieve actions on the mobile terminals unilaterally.

Another use scenario is described below based on user-defined 2D barcode. The user can define the user's own 2D barcode, and the 2D barcode can contain a combined action command identifier. For example, the user may open multiple browser windows when the user opens the mobile browser daily. The browser service provider can provide a service to the user for customizing 2D barcodes, such that the user can define a 2D barcode on his/her own.

The mobile terminal receives the user-defined action command information, and sends the user-defined action command information to the 2D barcode generator. The 2D barcode generator generates the corresponding 2D barcode, which may contain user-defined 2D barcode information such as user-defined actions command identifier, a call instruction to call the API for opening the browser, and the action parameters corresponding to the call instruction opening the browser.

The user-defined action command identifier indicates a user-defined 2D barcode for a combination of action commands, the content of the action command is to open the browser. The call instruction calls the API for opening the browser to invoke the browser application. The action parameter information includes parameters for opening the browser, such as universal resource locators (URLs) of the multiple windows commonly used by the user. Thus, the mobile terminal only needs to read or scan the user-defined 2D barcode once to open the mobile browser with multiple often-visited windows open.

Thus, the mobile terminal reads the user-defined 2D barcode information and, according to the call instruction indicating an API corresponding to a user action command in the 2D barcode, calls the API to carry out the user action command based on the action command identifier in the 2D barcode and the action parameters corresponding to the action command identifier. That is, by only scanning the 2D barcode once, the API corresponding to the action command can be called to carry out the action command.

Thus, the corresponding functions of the mobile terminal can be realized without having to interact with the backend server for mutual authentication. The action command can be executed only on the mobile terminal unilaterally, without the need to download and install related program. The user operating time can be reduced, and the cost for using the mobile terminal functionalities can also be reduced. Further, authentication and/or authorization information may be added in the action parameter information to increase the security of the action command execution.

Figure 3:
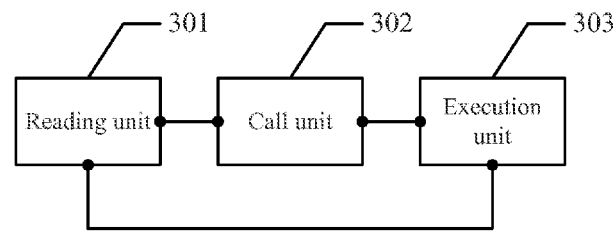
FIG. 3 illustrates a block diagram of an exemplary action command execution system consistent with the disclosed embodiments.

FIG. 3 illustrates an exemplary action command execution system consistent with the disclosed embodiments. As shown in FIG. 3, the action command execution system may include a reading unit 301, a call unit 302, and an execution unit 303.

The reading unit 301 is provided for reading the 2D barcode information, and the 2D barcode information includes an action command identifier and a call instruction for calling an API corresponding to the action command. The call unit 302 is used to call the API, and the execution unit 303 is provided for executing or carrying out the action command corresponding to the action command identifier.

Figure 4:
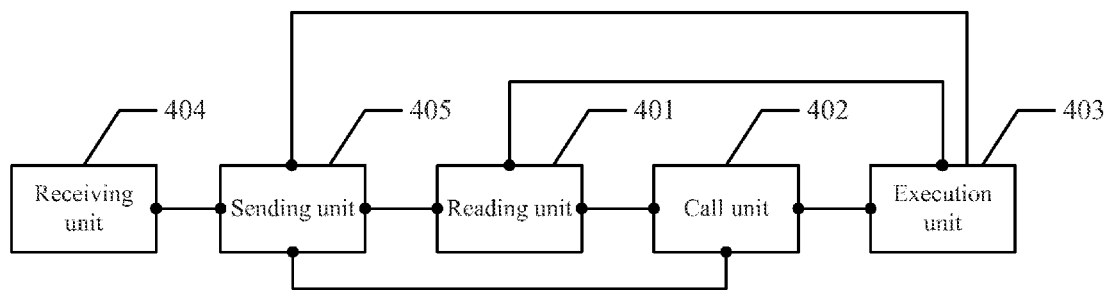
FIG. 4 illustrates a block diagram of another exemplary action command execution system consistent with the disclosed embodiments.

FIG. 4 illustrates another exemplary action command execution system consistent with the disclosed embodiments. As shown in FIG. 4, the action command execution system may include a reading unit 401, a call unit 402, and an execution unit 403.

The reading unit 401 is provided for reading the 2D barcode information, and the 2D barcode information includes at least an action command identifier and a call instruction for calling an API corresponding to the action command. Further, the action command identifier may be a single action command (i.e., indicating a single action) or may be a combined action command for performing a series of actions. The combined action command is used to execute multiple action commands as if executing a single action command, i.e., a batch execution.

The call unit 402 is used to call the API corresponding to the call instruction read by the reading unit 401, and the execution unit 403 is provided for executing or carrying out the action command corresponding to the action command identifier.

Further, the action command execution system may also include a receiving unit 404, and a sending unit 405.

The receiving unit 404 is provided for receiving user-defined action command information, and the sending unit 405 is used to send the user-defined action command to the 2D barcode generator, and the 2D barcode generator generates a corresponding user-defined 2D barcode.

Further, the 2D barcode information read by the reading unit 401 may include action parameter information corresponding to the action command identifier, and the execution unit 404 executes the action command based on the action parameters.

Thus, the receiving unit 404 receives the user-defined action command information, and the sending unit sends the user-defined action command information to the 2D barcode generator to generate the user-defined 2D barcode. The reading unit 401 reads the user-defined 2D barcode information and, according to the call instruction indicating an API corresponding to a user action command in the 2D barcode read by the reading unit 401, the call unit 403 calls the API. Based on the action parameter information corresponding to the action command identifier read by the reading unit 401, the execution unit 404 executes or carries out the action command corresponding to the action command identifier. That is, by only scanning the 2D barcode once, the API corresponding to the action command can be called to carry out the action command. The corresponding functions of the mobile terminal can thus be realized without having to interact with the backend server for mutual authentication. The action command can be executed only on the mobile terminal unilaterally, without the need to download and install related program. The user operating time can be reduced, and the cost for using the mobile terminal functionalities can also be reduced. Further, authentication and/or authorization information may be added in the action parameter information to increase the security of the action command execution Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND
ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and system for executing action commands in the 2D barcode, the mobile terminal reads the 2D barcode information and, according to the call instruction indicating an API corresponding to an action command in the 2D barcode, calls the API to carry out the action command based on the action command identifier in the 2D barcode. That is, by only scanning the 2D barcode once, the API corresponding to the action command can be called to carry out the action command. The corresponding functions of the mobile terminal can thus be realized without having to interact with the backend server for mutual authentication. The action command can be executed only on the mobile terminal unilaterally, without the need to download and install related program. The user operating time can be reduced, and the cost for using the mobile terminal functionalities can also be reduced.

What is claimed is:

1. A method for performing action commands on a mobile terminal, comprising:
 receiving user-defined action information from a user on the mobile terminal;
 creating a user-defined action command based on the user-defined action information;
 sending the user-defined action command to a two dimensional (2D) barcode generator to generate a 2D barcode containing 2D barcode information, wherein the 2D barcode information includes a user-defined action command identifier and a call instruction for calling an application program interface (API) corresponding to the user-defined action command;
 reading the 2D barcode to obtain the 2D barcode information;
 automatically calling the API corresponding to the user-defined action command; and
 directly completing execution of the user-defined action command corresponding to the user-defined action command identifier, wherein the execution is completed on the mobile terminal unilaterally without downloading an application program, and without interaction with a server for mutual authentication.

2. The method according to claim 1, wherein:
 the user-defined action command identifier includes a single-action command identifier and a combined action command for performing a series of action commands in a batch.

3. The method according to claim 2, wherein:
 the 2D barcode information further includes action parameter information corresponding to the user-defined action command identifier; and
 calling the API further includes:
 calling the API with the action parameter information to carry out the user-defined action command.

4. The method according to claim 3, wherein:
 the user-defined action command is to open a series of browser windows when opening a browser, and the action parameter information includes universal resource locators (URLs) of the series of browser windows.

5. The method according to claim 3, wherein:
 the user-defined action command is an action command provided by a business on a receipt to a customer of the business;

the user-defined action command is an action to connect a wireless network of the business;
the action parameter information includes a name of the wireless network and a password for accessing the wireless network; and
the reading a 2D barcode and calling the API further includes:
scanning the 2D barcode on the receipt;
reading the scanned 2D barcode to obtain the action command and the action parameter information; and
calling the API to connect to the wireless network with the action parameter information automatically.

6. The method according to claim 3, wherein the action parameter information further includes:
one or more of authentication information and authorization information.

7. An action command execution system, comprising:
a receiving unit configured to receive user-defined action information from a business and to create a user-defined action command based on the user-defined action information;
a sending unit configured to send the user-defined action command to a two dimensional (2D) barcode generator to generate a 2D barcode containing 2D barcode information, wherein the 2D barcode information includes a user-defined action command identifier, action parameter information corresponding to the action command identifier, and a call instruction for calling an application program interface (API) corresponding to the user-defined action command;
a reading unit configured to read the 2D barcode to obtain the 2D barcode information;
a call unit configured to automatically call the API corresponding to the user-defined action command with the action parameter information; and
an execution unit configured to directly complete execution of the user-defined action command;
wherein:
the 2D barcode is provided by the business on a receipt to a customer of the business and the action command is an action command to connect a wireless network of the business;
the action parameter information includes a name of the wireless network and a password for accessing the wireless network;
the reading unit is configured to:
scan the 2D barcode on the receipt; and
read the scanned 2D barcode to obtain the action command and the action parameter information; and
the call unit is further configured to automatically call the API to connect directly to the wireless network with the action parameter information.

8. A non-transitory computer-readable medium having computer program for, when being executed by a processor, implementing a method for performing action commands on a mobile terminal, the method comprising:
receiving user-defined action information from a user on the mobile terminal;
creating a user-defined action command based on the user-defined action information;
sending the user-defined action command to a two dimensional (2D) barcode generator to generate a 2D barcode containing 2D barcode information, wherein the 2D barcode information includes a user-defined action command identifier and a call instruction for calling an application program interface (API) corresponding to the user-defined action command;
reading the 2D barcode to obtain the 2D barcode information;
automatically calling the API corresponding to the user-defined action command; and
directly completing execution of the user-defined action command corresponding to the user-defined action command identifier, wherein the execution is completed on the mobile terminal unilaterally without downloading an application program, and without interaction with a server for mutual authentication.

9. The computer-readable medium according to claim 8, wherein:
the user-defined action command identifier includes a single-action command identifier and a combined action command for performing a series of action commands in a batch.

10. The computer-readable medium according to claim 9, wherein:
the 2D barcode information further includes action parameter information corresponding to the user-defined action command identifier; and
calling the API further includes:
calling the API with the action parameter information to carry out the user-defined action command.

11. The computer-readable medium according to claim 10, wherein:
the user-defined action command is to open a series of browser windows when opening a browser, and the action parameter information includes universal resource locators (URLs) of the series of browser windows.

12. The computer-readable medium according to claim 10, wherein:
the user-defined action command is an action command provided by a business on a receipt to a customer of the business;
the action command is an action to connect a wireless network of the business;
the action parameter information includes a name of the wireless network and a password for accessing the wireless network; and
the reading a 2D barcode and calling the API further includes:
scanning the 2D barcode on the receipt;
reading the scanned 2D barcode to obtain the action command and the action parameter information; and
calling the API to connect to the wireless network with the action parameter information automatically.

* * * * *